US009046368B2

(12) United States Patent
Bidel et al.

(10) Patent No.: US 9,046,368 B2
(45) Date of Patent: Jun. 2, 2015

(54) MEASUREMENT BY MEANS OF ATOM INTERFEROMETRY

(71) Applicant: ONERA (Office National d'Etudes et de Recherches Aérospatiales), Chatillon (FR)

(72) Inventors: Yannick Bidel, Palaiseau (FR); Nassim Zahzam, Palaiseau (FR); Alexandre Bresson, Palaiseau (FR)

(73) Assignee: ONERA (Office National D'Etudes et de Recherches Aerospatiales), Chatillon (FR)

( * ) Notice: Subject to any disclaimer, the term of this patent is extended or adjusted under 35 U.S.C. 154(b) by 0 days.

(21) Appl. No.: 14/365,855

(22) PCT Filed: Dec. 12, 2012

(86) PCT No.: PCT/FR2012/052895
§ 371 (c)(1),
(2) Date: Jun. 16, 2014

(87) PCT Pub. No.: WO2013/088064
PCT Pub. Date: Jun. 20, 2013

(65) Prior Publication Data
US 2014/0319329 A1  Oct. 30, 2014

(30) Foreign Application Priority Data
Dec. 16, 2011 (FR) ...................................... 11 61777

(51) Int. Cl.
*G01N 21/65* (2006.01)
*G01N 21/63* (2006.01)
(Continued)

(52) U.S. Cl.
CPC ................ *G01C 19/58* (2013.01); *G21K 1/006* (2013.01); *G01P 15/00* (2013.01); *G01V 7/00* (2013.01); *G01P 15/003* (2013.01); *G01V 7/02* (2013.01)

(58) Field of Classification Search
USPC .......... 250/232.1, 251, 361 R, 362, 368, 369, 250/379.1, 371, 390.08, 390.11, 391, 393, 250/396 R, 397, 458.1, 459.1, 526; 356/450, 356/486, 849, 951, 952, 955; 359/244–247, 359/278–281, 285, 287; 331/1 R, 3, 94.1; 372/32, 38.01
See application file for complete search history.

(56) References Cited

U.S. PATENT DOCUMENTS

2009/0272887 A1* 11/2009 Fatemi et al. .................. 250/251
2011/0073753 A1*  3/2011 Bouyer et al. ................. 250/251
2013/0168541 A1*  7/2013 Stoner et al. .................. 250/251

FOREIGN PATENT DOCUMENTS

FR  2848296 A1  6/2004

OTHER PUBLICATIONS

O. Carraz et al.: "Compact and robust laser system for onboard atom interferometry", *APPLIED PHYSICS B*, Lasers and Optics, Springer, Berlin. DE, vol. 97, No. 2, Aug. 6, 2009, 7 Pgs.
A. Peters et al.: "High-precision gravity measurements using atom interferometry", *Metrologia*, 2001, 38, 25-61, 37 Pgs.
(Continued)

*Primary Examiner* — Bernard E Souw
(74) *Attorney, Agent, or Firm* — Patterson Thuente Pedersen, P.A.

(57) ABSTRACT

The invention relates to a measurement by means of atom interferometry, using a Raman source that is created by modulating a monochromatic laser source. By conveniently selecting positions in which interactions between atoms and a laser radiation, produced by the Raman source, are caused, it is possible to eliminate or at least reduce a measurement bias caused by supplementary components of the laser radiation. Such a measurement having eliminated or reduced bias can be used in an inertia sensor.

14 Claims, 5 Drawing Sheets

(51) Int. Cl.
*G01V 7/00* (2006.01)
*G01P 15/00* (2006.01)
*G01P 9/00* (2012.01)
*G01C 19/58* (2006.01)
*G21K 1/00* (2006.01)
*G01V 7/02* (2006.01)

(56) References Cited

OTHER PUBLICATIONS

Form PCT/ISA/220, Form PCT/ISA/210 and Form PCT/ISA/237—International Search Report and Written Opinion for PCT/FR2012/052895 (10 pages).

* cited by examiner

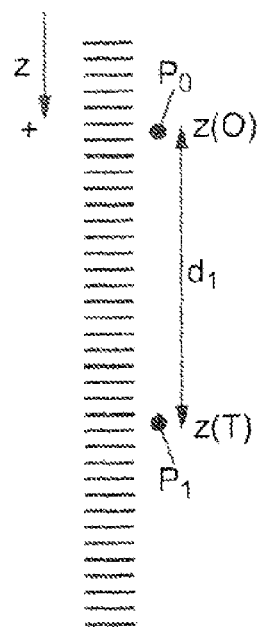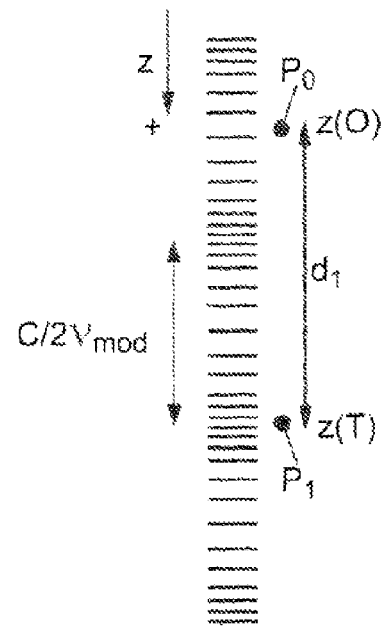
FIG. 5a  FIG. 5b
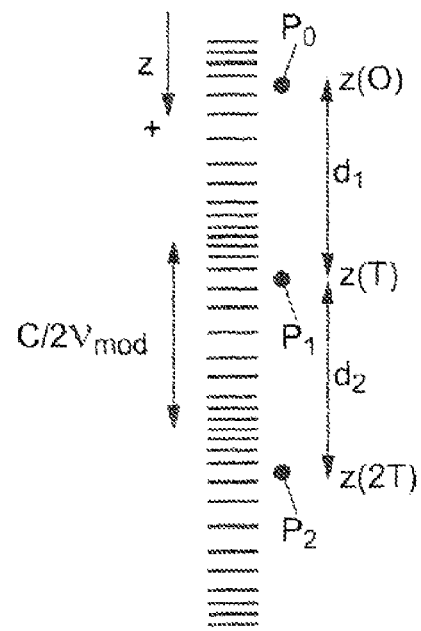
FIG. 5c

MEASUREMENT BY MEANS OF ATOM INTERFEROMETRY

PRIORITY CLAIM

The present application is a National Phase entry of PCT Application No. PCT/FR2012/05285, filed Dec. 12, 2012, which claims priority from FR Patent Application No. 11 61777, filed Dec. 16, 2011, said applications being hereby incorporated by reference herein in their entirety.

FIELD OF THE INVENTION

The present invention relates to performing measurements by means of atom interferometry.

BACKGROUND OF THE INVENTION

It is known to produce interference between matter waves which are associated with cold atoms, in order to measure accelerations very accurately. Devices which implement such atomic interferences are for example accelerometers, gyrometers, gravimeters, gradiometers, etc.

In a simplified manner, a matter wave associated with a set of atoms which are initially in a ground state, most often of a hyperfine structure, is divided into two by a first interaction with a laser radiation. The duration of this interaction can be selected for example so that the two matter waves have substantially equal amplitudes. Such an interaction has a function equivalent to that of a beam splitter in optics, and is called a $\pi/2$ pulse in the terminology of a person skilled in the art.

Additional interactions are then produced between the atoms of each matter wave and subsequent laser pulses, according to a sequence of successive interactions which finally produces the interference between the matter waves. A detector is then placed in the interference field, in order to measure the number of atoms which are in one or other of the atomic states: the ground state or the higher energy state. Due to the interference, this number of atoms measured depends on a phase shift which has been progressively accumulated between the two matter waves since their separation by the $\pi/2$ pulse, and which contains the sought measurement information.

Each interaction between an atom and the laser radiation has two simultaneous effects: causing a transition of the atom between its two quantum states, in a direction which is opposite with respect to an absorption and an emission, and simultaneously a variation in the momentum of the atom which corresponds to the momentum of the radiation absorbed or emitted.

Usually, a Raman source is used in order to generate the laser radiation which produces each interaction with one of the atoms. Such a Raman source in fact produces two monochromatic radiation components, each of laser type, the respective wavelengths of which are selected in order to cause a two-photon interaction with one atom. These two monochromatic components form beams which are spatially superimposed parallel to the same axis of propagation, and which each propagate simultaneously in the two opposite directions along this common axis. The interaction between such composite laser radiation and the atoms comprises an absorption and an emission, so that the difference between the energies of the atomic states is equal to the difference between the respective frequencies of the two monochromatic components of the radiation multiplied by Planck's constant h. The variation in the momentum of the atom which undergoes the interaction is then equal to the sum of these frequencies, multiplied by h/C, where C is the velocity of propagation of the laser radiation. FIG. 1 illustrates such interactions, in the case of an absorption of energy in the left part of the figure, and an emission in the right part of the figure. The references used in this figure have the following meanings:

F: ground state of the atoms
E: fine structure state of the atoms, which has a higher energy than that of state F
G: difference in energy between states F and E
$\lambda_1$, $\lambda_2$: respective wavelengths of the two monochromatic components of the laser radiation which is produced by the Raman source The Raman source can have several known implementations.

According to one of these implementations, the Raman source comprises two separate laser sources which each produce one of the monochromatic components of the total laser radiation of the Raman source. The respective frequencies of the two laser sources are precisely adjusted in relation to each other by superimposing the two monochromatic components on a rapid photodiode. The photodiode then makes it possible to detect the beat of the wave superimposition, with the frequency of this beat corresponding to the difference between the frequencies of the two laser sources. It is thus possible to precisely tune this difference in frequencies to the energy difference G between the atomic levels F and E. But such a implementation of the Raman source is complex and bulky since it comprises two separate laser sources. For this reason, it is not suitable for producing devices for measurement by means of atom interferometry which are compact and weigh as little as possible. The weight constraint is even more significant for devices which are intended to be carried on board an aircraft such as a plane or helicopter, or on board a spacecraft such as a rocket, satellite or space probe.

According to another known implementation, the Raman source comprises only a single laser source, which is amplitude- or frequency-modulated, or both. Such a Raman source is described in particular in the article by O. Carraz et al. entitled "Compact and robust laser system for onboard atom interferometry", Applied Physics B (2009) 97, pp. 405-411, and also in the thesis by O. Carraz entitled "Gravimètre atomique embarquable: Etude théorique et expérimentale de l'instrument", and presented at the Paris Observatory on 19th December. The Raman source which is thus constituted is particularly compact and robust, such that it is suitable for producing measurement devices that are themselves less bulky and less heavy. But such a method of generating the laser radiation for Raman interactions—by modulation of a single laser source—simultaneously produces at least three monochromatic radiation components which have distinct respective frequencies. Now, only two of these frequencies are useful for measurements which are carried out by means of atom interferometry. The additional monochromatic component which results from the modulation of the laser source then produces a measurement bias, which in turn produces an error in the measurement result.

SUMMARY OF THE INVENTION

Under these conditions, an object of the present invention consists in performing measurements by means of atom interferometry which are devoid of such measurement bias, while using a device which is compact, robust and as light as possible.

In order to achieve this object and others, the invention proposes a method of measurement by means of atom interferometry, in which several interactions between a laser radiation and atoms are successively caused. The atoms progress over a path which is not situated in a plane perpendicular to an axis of propagation of the laser radiation, so as to form an interferometer for the atoms.

The laser radiation which is used for each interaction, at different positions of the atoms on their path, comprises at least one first and one second monochromatic components with respective frequencies which are distinct, so that the interaction is of the two-photon Raman type, with an absorption and an emission each stimulated by the first or the second monochromatic component.

Moreover, the first monochromatic component is part of an initial laser radiation, and the second monochromatic component results from a modulation of the same initial laser radiation at a determined modulation frequency. In other words, the Raman source which is used for the invention has the second implementation presented above.

The method of the invention is characterized in that a distance between any two of the positions at which interactions are caused, measured along the axis of propagation of the laser radiation, is a multiple of a modulation length to within ±10% of this modulation length. The modulation length is equal to the velocity of propagation of the laser radiation divided by twice the determined modulation frequency. In this way, a measurement result is not substantially modified by a third or more other monochromatic component(s) of the laser radiation which result(s) from the modulation of the initial laser radiation and which participate(s) in additional interactions of the two-photon Raman type with the atoms, this third or these other monochromatic component(s) having one wavelength (wavelengths) which is (are) different from those of the first and second monochromatic components.

Thus, the invention makes it possible to use a Raman source with a single laser source, while avoiding the measurement bias that is produced by at least one additional monochromatic component of radiation which is due to the modulation of this laser source, but which is not used to perform the measurement. This measurement bias is eliminated or at least reduced by selecting according to the invention the positions on the path of the atoms where the interactions with the laser radiation are produced. A measurement device which is compact, robust and lighter can thus be used.

In a mathematical formulation, the invention is equivalent to the following relationship (1), which is satisfied irrespective of a pair of successive interactions between the laser radiation and the atoms:

$$u \cdot (r_{n+1} - r_n) = m_{n+1} \cdot C/(2 \cdot v_{mod}) \tag{1}$$

where n is a positive integer or zero counting the successive interactions between the atoms and the laser radiation along the path of the atoms, n=0 corresponding to the first interaction, u is a unit vector of the axis of propagation of the laser radiation, $r_{n+1}$ and $r_n$ are vectors linking a point of origin to the respective positions of the atoms at the time of the successive interactions n and n+1, $m_{n+1}$ is a non-zero integer for the pair of interactions n and n+1, and $v_{mod}$ is the determined modulation frequency of the initial monochromatic laser radiation.

By introducing a 10% tolerance for the application of the invention, equation (1) becomes:

$$|u \cdot (r_{n+1} - r_n) - m_{n+1} \cdot C/(2 \cdot v_{mod})| \leq 0.1 \cdot C/(2 \cdot v_{mod}) \tag{1'}$$

in which the vertical bars denote the absolute value. Preferentially, in order to further reduce the residual measurement bias, the 10% tolerance can be replaced by 5%, or further reduced to 2%, or even 1%.

In possible simplified configurations for implementing the invention, the path of the atoms can be rectilinear and parallel to the axis of propagation of the laser radiation, and superimposed thereon.

In particular implementations of the invention when the atoms are subjected only to a gravity field or gravitational field denoted g, the following relationships can be satisfied irrespective of the pair of successive interactions between the laser radiation and the atoms, to within 5% with respect to the value of each equality, preferably to within 2%:

$$T = [a \cdot C/(2 \cdot v_{mod} \cdot g \cdot u)]^{1/2} \tag{2a}$$

$$v_0 \cdot u = (b - a/2) \cdot [C \cdot g \cdot u/(2 \cdot a \cdot v_{mod})]^{1/2} \tag{2b}$$

where T is the period of time separating the two successive interactions, u is also the unit vector parallel to the axis of propagation of the laser radiation, a and b are integers, a being non-zero, and $v_0$ is a velocity vector of the atoms at the time of the first interaction of the sequence of interactions. The numbers a and b are constant for all the pairs of successive interactions, so that all the interactions are caused at regular time intervals, separated by the time period T.

Generally, a method according to the invention can be used for measuring an acceleration, a speed of rotation, a gravity field, or a gravity field gradient.

Generally also, the successive interactions can form any sequence, in particular based on π/2 pulses and π pulses, optionally extended by multiples of 2·π.

Generally also, the distance between two of the positions of the atoms at which interactions are caused can be adjusted according to one of the following methods, for preferred implementations of the invention:

/i/ by adjusting the time intervals separating the interactions between the atoms and the laser radiation and by adjusting the initial velocity of the atoms when these are launched at the start of the path; or /ii/ by adjusting the time intervals separating the interactions between the atoms and the laser radiation and by adjusting a waiting time between the placing of the atoms at the start of the path, with an initial zero velocity for the atoms, and the first interaction of the atoms with the laser radiation; or /iii/ by combining methods /i/ and /iii/.

The invention also proposes a device for measurement by means of atom interferometry, which comprises:

a source of atoms, which is suitable for producing an initial set of atoms intended to progress over a path;

an interferometry system, which is suitable for forming an interferometer for the atoms, and which itself comprises:

a device for producing a laser radiation, arranged in order to successively cause several interactions between atoms and the laser radiation and, in order to produce each interaction, comprising:

a laser source suitable for producing an initial monochromatic laser radiation; and a modulator arranged for modulating the initial monochromatic laser radiation, so that each laser radiation used for each interaction comprises at least one first and one second monochromatic components having respective frequencies which are distinct, and suitable so that each interaction is of the two-photon Raman type, with an absorption and an emission each stimulated by the first or the second monochromatic component, the first monochromatic component being part of the initial monochromatic laser radiation, and the second monochromatic component resulting from a modulation of this initial monochromatic laser radiation produced by the modulator at a determined modulation frequency; and a control unit, which is suitable for directing the laser radiation at the atoms when the latter are situated at determined positions on the path, this path not being situated in a plane perpendicular to the axis of propagation of the laser radiation; and a detection device, which is arranged in order to provide a measurement result based on the interference.

The device of the invention is characterized in that the control unit is moreover adjusted in order to direct the laser radiation at the atoms when the distance between any two of the positions at which the interactions are caused, measured along the axis of propagation of the laser radiation, is a multiple of a modulation length to within ±10% of this modulation length, and this modulation length being equal to the velocity of propagation of the laser radiation divided by twice the determined modulation frequency. Such a device is suitable for implementing a measurement method as described previously, such that the measurement result is not substantially modified by one or more other components of the laser radiation which result from the modulation of the initial monochromatic laser radiation and which participate in additional interactions of the two-photon Raman type with the atoms, and which have one or more wavelengths different from those of the first and second monochromatic components.

Preferably, the control unit can be adjusted so that the 10% tolerance is replaced by 5%, or reduced to 2%, or even 1%.

Such a measurement device according to the invention may be of the inertial sensor type, such as an accelerometer, a gyrometer, a gravimeter or a gradiometer.

When the distance between two of the positions of the atoms at which interactions are caused is adjusted according to one of the methods /i/, /ii/ and /iii/ listed above, the device may moreover comprise means for modifying the velocity of the atoms during the first interaction between the atoms and the laser radiation and means for modifying the synchronisation of interaction between the atoms and the laser radiation, these means being arranged so that the distance between two of the positions of the atoms at which interactions are caused is adjusted by modifying the initial velocity of the atoms and the synchronisation of the interactions between the atoms and the radiation. The means for controlling the velocity of the atoms is for example the use of a variable waiting period between the start of the path of the atoms and the first interaction between the atoms and the laser radiation. This means can also be a launching of the atoms at the start of the path. The means for controlling the synchronisation of interaction between the atoms and the laser radiation is for example the use of an optical shutter. It then also comprises means for controlling the shutter which are suitable for adjusting the distance between two of the positions of the atoms at which the interactions are caused.

BRIEF DESCRIPTION OF THE DRAWINGS

Other features and advantages of the present invention will become apparent from the following description of non-limitative embodiment examples, with reference to the attached drawings in which:

FIG. 3b is a spectral diagram of a laser radiation produced by a Raman source corresponding to FIG. 3a;

FIGS. 5a to 5c correspond to implementation of an interferometer according to the present invention.

For clarity sake, the dimensions of the different elements represented in the figures do not correspond either to actual dimensions or to actual dimensional relationships. Moreover, identical references that are indicated in different figures denote identical elements, or elements with identical functions.

DETAILED DESCRIPTION OF THE DRAWINGS

Figure 1:
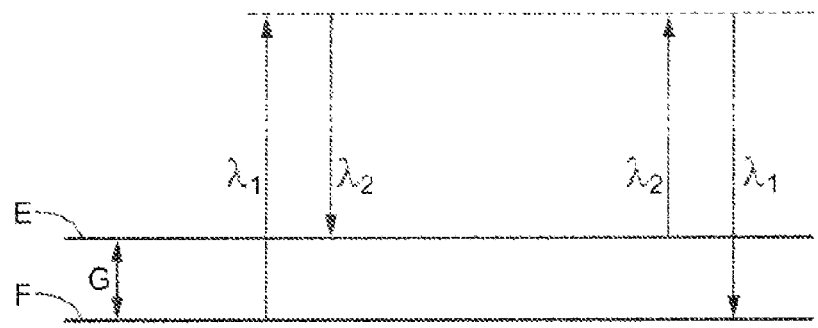
FIG. 1 is a diagram illustrating Raman-type interactions between atoms and a laser radiation.

FIG. 1 which has already been described in detail is not repeated here. However, its meaning and its references are used hereafter.

Figure 2A:
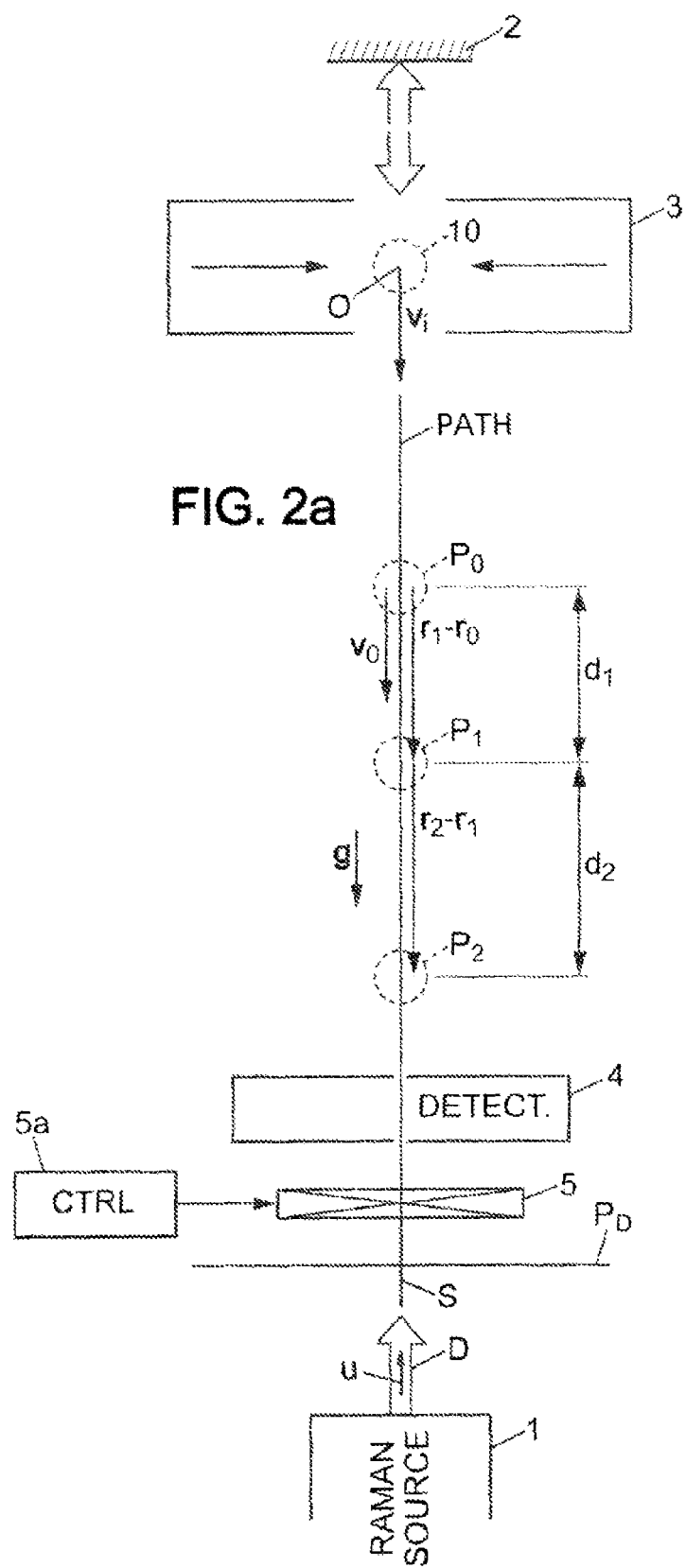
FIGS. 2a and 2b represent two possible configurations of devices for measurement by means of atom interferometry according to the invention.
Figure 2B:
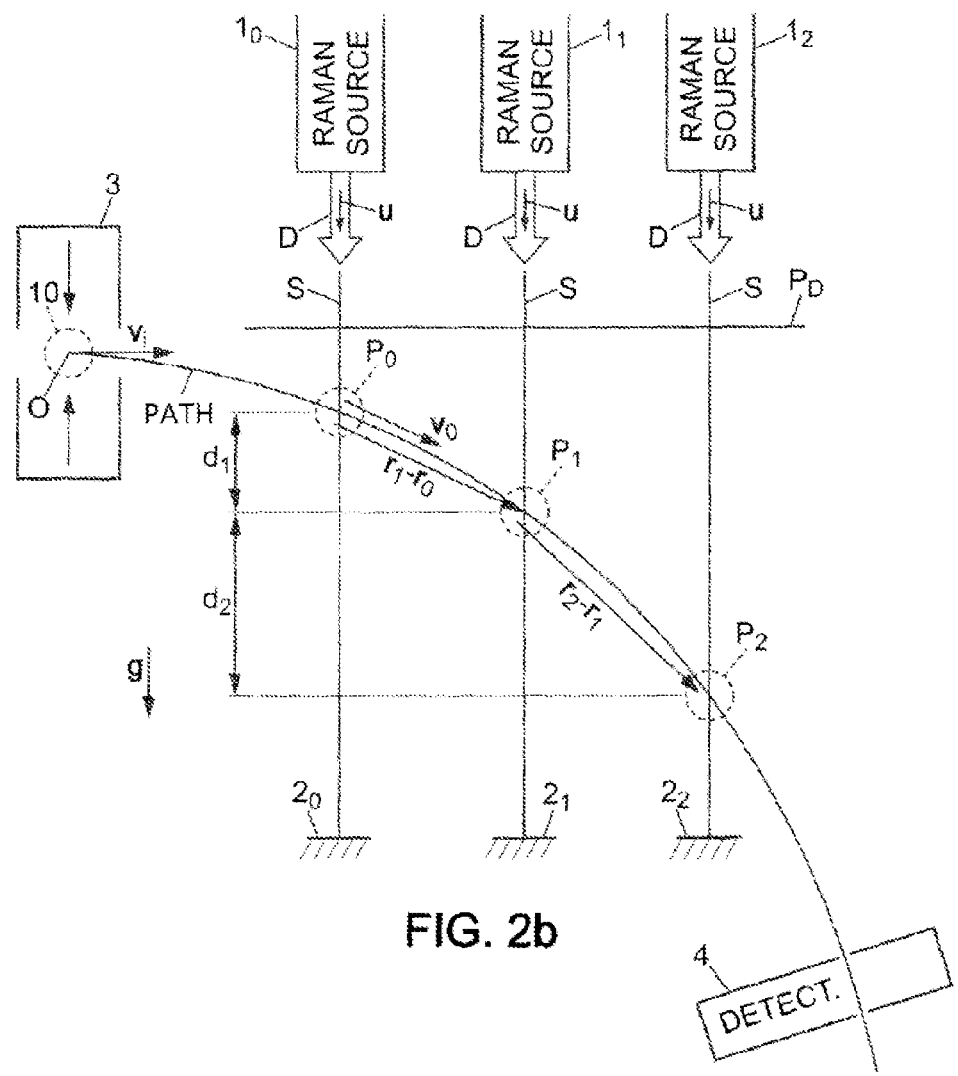

According to FIG. 2a or 2b, a set of cold atoms 10, at a temperature of the order of 1 μK (microkelvin) for example, is produced by a magneto-optical trap 3. The operation of such a magneto-optical trap is not the subject of the invention and is known to a person skilled in the art, so that it is not necessary to repeat it here. The set of atoms 10 can contain a few million atoms. After leaving the trap 3, the set of atoms 10 is subjected to inertial forces and describes the path PATH. $v_i$ is the initial velocity vector of the atoms 10 at the starting point of the path PATH. Specific means (not shown) can be used for transferring the atoms 10 from the trap 3 to the starting point of the path PATH, while adjusting the initial velocity $v_i$. Such means of transfer and initial launching of the atoms 10 are known, so that it is also unnecessary to describe them again here. For example, a quasi-stationary electromagnetic wave lift can be used.

When the atoms 10 are situated at different positions on the path PATH, they undergo several successive Raman interactions with appropriate laser radiations denoted S. For example, the atoms 10 undergo three Raman interactions when they are situated in the positions $P_0$, $P_1$ and $P_2$ on the path PATH. These positions can be located with reference to any point of origin O, which can be for example the starting point of the path PATH. $r_n$ then denotes the vector which links this point of origin O to the position $P_n$, n being an index which locates the successive Raman interactions in their chronological order along the path PATH: n=0, 1 or 2 for the case of three interactions shown. The differential vectors $r_1-r_0$ and $r_2-r_1$ are indicated in FIGS. 2a and 2b. $v_0$ is the velocity vector of the atoms 10 at the time of the first Raman interaction, produced when the atoms 10 are in position $P_0$.

For the application of the invention, all the laser radiations which are used have axes of propagation which are parallel to each other. Given that these are Raman radiations, they each propagate in both directions along these axes simultaneously. The following references and notations are used:

D: common axis of propagation of the laser radiations
u: unit vector parallel to direction D
$P_D$ plane perpendicular to direction D
1, $1_0$, $1_1$, $1_2$: Raman sources described below

2, $2_0$, $2_1$, $2_2$: mirrors or sets of mirrors making it possible to obtain the propagation of each laser radiation in both directions

$d_1$: distance between points $P_0$ and $P_1$, measured along direction D

$d_2$: distance between points $P_1$ and $P_2$, measured along direction D

In other words: $d_1 = u \cdot (r_1 - r_0)$ and $d_2 = u \cdot (r_2 - r_1)$.

For the invention, the path PATH has no component in a plane $P_D$ perpendicular to the axes of the Raman radiation.

The times of emission and the durations of the laser radiation pulses may be controlled by an optical shutter 5, itself controlled by a controller 5a (FIG. 2a).

The sequence of the successive Raman interactions is selected in order to constitute a matter-wave interferometer. For example, this sequence may be constituted by a $\pi/2$ interaction when the atoms 10 are in position $P_0$, by a $\pi$ interaction when the atoms are in position $P_1$, and by another $\pi/2$ interaction at position $P_2$, with periods of separation which are identical between the first $\pi/2$ pulse and the $\pi$ pulse on the one hand, and between this $\pi$ pulse and the second pulse $\pi/2$. Such a sequence is of the Mach-Zehnder type and is assumed to be known. However, it is understood that the entire present description of the invention can be applied to any sequence of pulses which produces an atomic wave interferometer with variable numbers of pulses. For example, another possible sequence can be constituted by four $\pi/2$ pulses which are produced at times $t_0$, $t_0+T$, $t_0+T+T'$ and $t_0+2T+T'$ respectively, where $t_0$ is the time of the first pulse, and T and T' are two waiting periods. Another four-pulse sequence which is also possible can be $\pi/2$ at $t_0$, $\pi$ at $t_0+T$ and $t_0+2T+T'$, then again $\pi/2$ at $t_0+2T+2T'$.

Finally, the atoms 10 are subsequently detected by a detector 4, denoted DETECT, in order to determine the numbers of those atoms which are in the ground state F and in the excited state E (see FIG. 1) respectively. Due to the atomic interference effect, these numbers depend on a phase shift which is produced by the inertial effects to which the atoms 10 are subjected between the successive Raman interactions. The operation of the detector 4 is also assumed to be known. For example, it can operate by detecting the fluorescence which is produced by the atoms 10.

The configuration of FIG. 2a is linear, with the path PATH which is rectilinear, parallel to the direction D and superimposed on the laser radiation S. In this case, the same Raman source referenced 1 can be used in order to generate all the pulses of laser radiation S which produce the Raman interactions with the atoms 10.

In the configuration of FIG. 2b, several Raman sources $1_0$, $1_1$, ... are used with respective laser beams which are shifted perpendicularly to the axis of propagation D and to the unit vector u which is associated therewith. In this case, the path PATH can be curved. The positions of interactions of the atoms 10 with the laser radiations S of the Raman sources $1_0$, $1_1$, ... are then situated at the intersections between the path PATH and the respective beams of these radiations.

Such devices for measurement by means of atom interferometry were known before the present invention, in particular for the two configurations of FIGS. 2a and 2b.

Figure 3A:
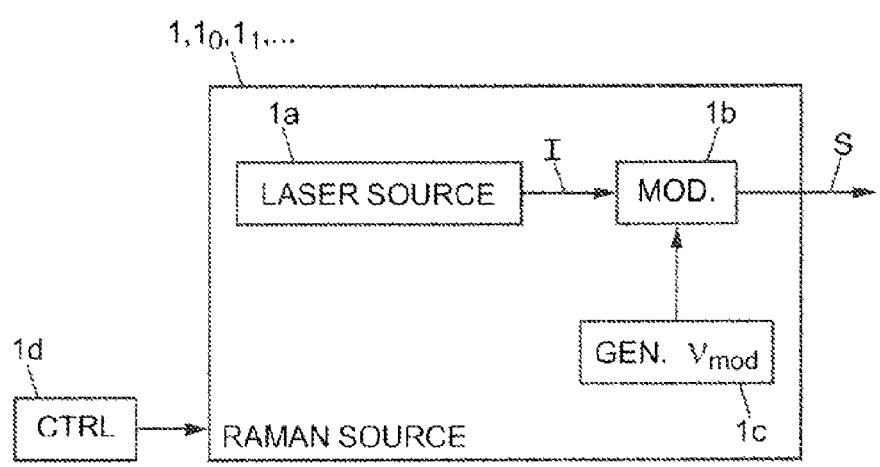
FIG. 3a illustrates the implementation of a Raman source, for which the invention can be used.

The invention is useful when at least one of the Raman sources, or each Raman source, which is used has the second implementation which has been described above. FIG. 3a is a basic illustration of this implementation. The Raman source 1 (or $1_0$, $1_1$, ... ) thus comprises a laser source 1a which produces an initial monochromatic radiation referenced I, and having the wavelength $\lambda_1$. This radiation I is introduced into a modulator 1b, which is denoted MOD. and which is connected by a control input to a frequency generator 1c denoted GEN. The frequency which is produced by the generator 1c is denoted $v_{mod}$, and the modulation which is produced by the modulator 1b may be a frequency or amplitude modulation of the initial radiation I, or a mixed frequency and amplitude modulation. The laser radiation S leaving the modulator 1b constitutes the outlet radiation of the Raman source 1. It then produces one of the Raman interactions with the atoms 10. In the present description, the radiation S is simply called laser radiation, as it is produced by the whole Raman source 1, or $1_0$, $1_1$, ....

Each Raman source 1, or $1_0$, $1_1$, ... may be coupled with a control unit which is denoted CTRL and referenced 1d. The unit 1d is suitable for controlling an operation of this Raman source which is in accordance with the principle of the atom interferometer used. In particular, the unit 1d controls the frequency generator 1c, and may moreover control the modulator 1b in order to trigger the emission of the pulses of laser radiation S, as well as to control the duration of these pulses.

Figure 3B:
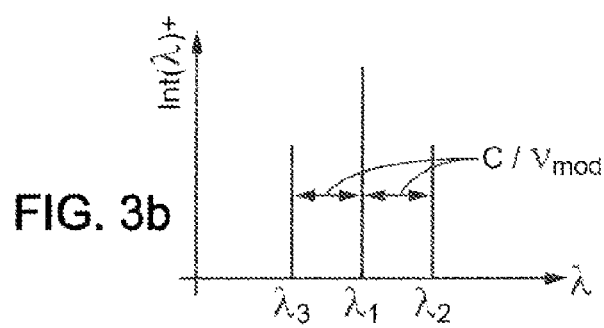

The laser radiation S which is thus produced then has at least three monochromatic components as shown in the spectral diagram of FIG. 3b. In this diagram, the value of wavelength $\lambda$ is shown along the horizontal axis, and the spectral density, denoted $Int(\lambda)$ is shown along the vertical axis. The first component has the wavelength $\lambda_1$ of the initial radiation I as produced directly by the laser source 1a. The monochromatic components which are created by the modulation have wavelengths which are respectively equal to $\lambda_1 + k \cdot C/v_{mod}$, where C is the velocity of propagation of the laser radiation, and k is a non-zero integer, which is positive or negative. For the remainder of the description, only the monochromatic components which correspond to $k=\pm 1$, in addition to the component of wavelength $\lambda_1$ are considered, but it is understood that the advantages of the invention are obtained irrespective of the number of the monochromatic components which result from the modulation and are present in the laser radiation S. In the following, the wavelengths of the two additional monochromatic components of the laser radiation S, in addition to the component with the initial wavelength $\lambda_1$, and corresponding to $k=\pm 1$, are denoted $\lambda_2 = \lambda_1 + C/v_{mod}$ and $\lambda_3 = \lambda_1 - C/v_{mod}$.

The monochromatic components of the radiation S which have the wavelengths $\lambda_1$ and $\lambda_2$ respectively, cause Raman absorptions (left part of FIG. 1) and Raman emissions (right part of FIG. 1) as has already been described.

Figure 4A:
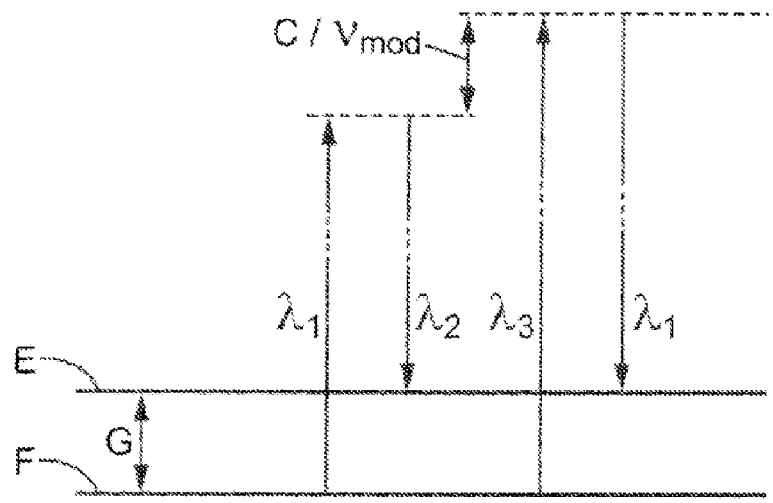
FIGS. 4a and 4b correspond to FIG. 1, in order to show additional Raman interactions appearing when a laser radiation according to FIG. 3b is used.
Figure 4B:
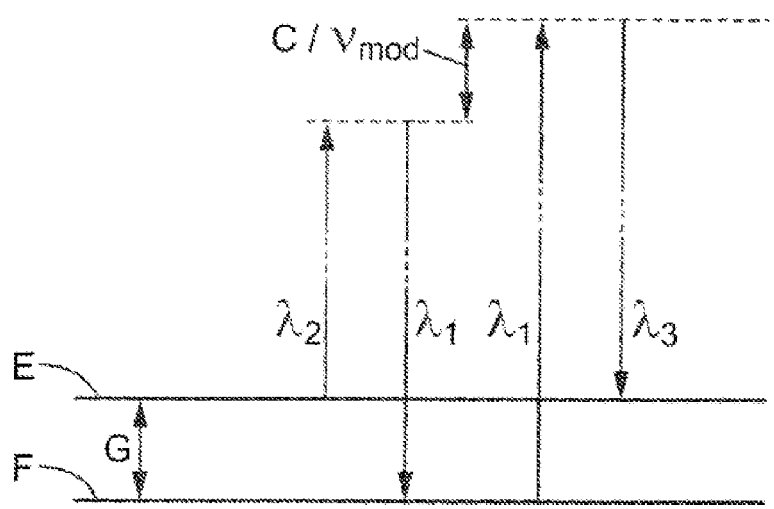

However, the pair of monochromatic components of respective wavelengths $\lambda_3$ and $\lambda_1$, which is also contained in the laser radiation S, produces Raman absorptions and emissions in the same manner. FIG. 4a illustrates the Raman absorptions which result from the pair of $\lambda_1$ and $\lambda_2$ monochromatic components (left part of FIG. 4a, identical to the left part of FIG. 1), as well as those which result from the pair of $\lambda_3$ and $\lambda_1$ monochromatic components (right part of FIG. 4a). The vertical axes of FIGS. 1, 4a and 4b correspond to the energy gaps between the atomic levels, which are inversely proportional to the values of wavelength $\lambda$. Similarly, FIG. 4b illustrates the Raman emissions which result from the pair of the $\lambda_1$ and $\lambda_2$ monochromatic components (left part of FIG. 4b, identical to the right part of FIG. 1), as well as those which result from the pair of the $\lambda_3$ and $\lambda_1$ monochromatic components (right part of FIG. 4b). The presence of several Raman absorption and emission possibilities produces a measurement bias which, in turn, produces an error in the matter-wave interferometry measurement result.

According to the invention, this bias is cancelled out or reduced if the gap between the Raman interaction positions $P_n$, for all the pairs of positions $P_n$ where these interactions are produced, is a multiple of $C/(2 \cdot v_{mod})$. The notations n, $P_n$, C and $v_{mod}$ are those which were introduced previously. The relationship (1) which is indicated in the general part of this description is then complied with, irrespective of the pair of successive Raman interactions n and n+1 along the path PATH, for n=0, n=1, etc. With the notations introduced for FIGS. 2a and 2b, the relationship (1) becomes:

$$d_1 = m_1 \cdot C/(2 \cdot v_{mod}) \text{ and } d_2 = m_2 \cdot C/(2 \cdot v_{mod})$$

where $m_1$ and $m_2$ are two positive natural integers.

By way of illustration and for the sake of clarity, the detailed description of the invention is now continued in the case of a gravimeter, intended to measure the gravity value very accurately. The gravity orientation, denoted g, is indicated in FIGS. 2a and 2b. For such a measurement, the device is oriented so that the unit vector u is not perpendicular to the direction of gravity g, according to the principle of measurement by matter-wave interferometry. Moreover, a first estimation of the value of g can be provided initially, based on which measurement by matter-wave interferometry produces a measured value which is much more accurate. Such an initial estimation of the gravity value can result from an earlier measurement which was performed using the same matter-wave interferometry device, or using a geodesic model, or also using any other gravity field measuring device, in particular of the usual accelerometer type. In the case of the Earth's gravity, an initial estimation of 9.8 m/s² (meter per second squared) can be used.

All the distances and velocities which are considered below are measured along direction D, oriented according to the unit vector u. Preferably, the device can be oriented so that the vector u is parallel to the direction of gravity g. In this case, the velocity of the atoms 10 at the time of their first interaction with the laser radiation S in order to cause Raman absorptions, is $v_0 = g \cdot t_0 + v_i$, where $t_0$ is the flight time of the atoms 10 between their positioning at the start of the path PATH and the time of the first interaction. In this case, the time $t_0$ and/or the initial velocity $v_i$ of the atoms 10 is (are) adjusted so that $v_0$ has one of the following values:

$$v_0 = (b - a/2) \cdot [C \cdot g/(2 \cdot a \cdot v_{mod})]^{1/2} \quad (2b')$$

when a is a non-zero positive integer and b is a positive or negative integer, possibly zero. In this case, the constant time T separating two successive interactions is:

$$T = [a \cdot C/(2 \cdot v_{mod} \cdot g)]^{1/2} \quad (2a')$$

In preferred embodiments of the invention, for which the successive interactions between the atoms 10 and the laser radiation S constitute a Mach-Zehnder type sequence, comprising three pulses of laser radiation which are produced at regular time intervals: a first π/2 pulse, then a second π pulse, and a last π/2 pulse, the number b which makes it possible to have the most compact device for a given number a, i.e. for a given time T between two successive interactions, is equal to b=(−a+1)/2 if the number a is odd, and b=(−a+2)/2 if the number a is even. These configurations are possible if the initial velocity of the atoms is opposed to the acceleration of gravity g, i.e. when the atoms are launched. When there is no launching, i.e. the initial velocity of the atoms is in the same direction as the acceleration of gravity, the number b which makes it possible to have the most compact device for a given number a, i.e. for a given time T between two successive interactions, is equal to b=(a+1)/2 if the number a is odd, and b=(a+2)/2 if the number a is even.

The following table shows other numerical examples of gravimeters according to the invention. The atoms used are rubidium 87 and the modulation frequency $v_{mod}$ which is used for the Raman source is 6.8 GHz (gigahertz). L is the length of the zone, measured parallel to gravity g, in which the path PATH of the atoms is entered into between the starting point where the atoms 10 are placed with the initial velocity $v_i$ on this path and the position $P_{N-1}$ of the atoms where the last interaction (N−1) is produced with the laser radiation S.

| a | b | $t_0$ (ms) | $v_i$ (m·s⁻¹) | $v_0$ (m·s⁻¹) | T (ms) | L (cm) |
|---|---|---|---|---|---|---|
| 1 | 0 | 23.7 | 0 | 0.232 | 47.4 | 6.9 |
| 1 | 1 | 0 | −0.232 | −0.232 | 47.4 | 2.5 |
| 3 | −1 | 13.7 | 0 | 0.134 | 82.1 | 15.5 |
| 3 | 2 | 0 | 0.661 | −0.661 | 82.1 | 4.5 |

The inventors now provide an intuitive interpretation of the invention, for cancelling out the measurement bias which is due to the production of the Raman source(s), each from a modulated laser source.

The atom interferometer produces measurements of inertial variables such as acceleration or rotation, by detecting the movement of a set of cold atoms relative to a frame of reference which is linked to the Raman source. More precisely, at each interaction between the atoms and the laser radiation of the Raman source, the laser phase is entered into the matter-wave which is associated with the atoms. Thus, the phase at the interferometer output corresponds to a combination of the gaps between the positions of the atoms at the times of their interactions with the laser radiation. In the case of a gravimeter, this phase is equal to:

$$\varphi = \frac{4\pi}{\lambda} \cdot \{[z(2T) - z(T)] - [z(T) - z(0)]\} = \frac{4\pi}{\lambda} \cdot g \cdot T^2$$

where λ is the wavelength of the laser radiation, and z(0), z(T), z(2T) indicate the positions of the atoms at the time of the first, second and third pulses respectively, for the Mach-Zehnder type sequence used by way of example. The z axis referencing the marks is parallel to the direction of gravity g.

It is thus possible to interpret the inertial measurements of an atom interferometer as a succession of measurements of the positions of the atoms relative to a graduated ruler, the unit of length of which would be equal to half of the laser wavelength.

The use of a Raman source which is produced by modulating an initial monochromatic laser source, produces one or more additional components which cause a bias in the measurement by atom interferometry. This bias can be visualized as a periodic fault on the graduated ruler which serves to measure the gaps between the positions of the atoms, parallel to the z axis. The spacing between the graduations is then no longer constant, but it varies periodically parallel to the z axis with a spatial period which is equal to $C/(2 \cdot v_{mod})$, and which is called modulation length. Therefore, it is actually a bias which is introduced into the measurement itself.

One way of eliminating or reducing this bias then consists in adopting a configuration for the interferometer, in which the distances to be measured are multiples of the modulation length, i.e. multiples of $C/(2 \cdot v_{mod})$. Thus an atom interferometer which uses a Raman source produced by modulating an initial monochromatic laser source, will have a zero bias if the gaps between the successive positions $P_n$ of the atoms 10 are multiples of $C/(2 \cdot v_{mod})$, at the time of the interactions between the atoms 10 and the laser radiation S. This condition corresponds exactly to equation (1) set out in the first part of this description. FIGS. 5a to 5c illustrate this interpretation.

FIG. 5a corresponds to a Raman source interferometer which has the first implementation presented in the introductory part of the present description: with two distinct laser sources devoid of any monochromatic component other than those which participate in the interactions with the atoms. The result of the measurement of the gap $d_1$ between the marks $z(0)$ and $z(T)$ corresponding to the positions $P_0$ and $P_1$ of the atoms 10 is accurate.

FIG. 5b corresponds to the implementation of the Raman source which is considered in the invention, but without using the invention. The Raman source is therefore constituted by an initial laser source which is modulated. The graduation for referencing the z marks then has the periodic modulation with the modulation length $C/(2 \cdot v_{mod})$. This modulation of the space between the graduations generally introduces an error into the result of measurement of distance $d_1$. For visualization purposes, $d_1$ corresponds to 16 graduations in the case of FIG. 5a, but to 12 graduations in the case of FIG. 5b.

Finally, FIG. 5c illustrates the invention. The positions $P_0$, $P_1$ and $P_2$ have been selected so that the distances $d_1$ and $d_2$ are equal to integers that multiply the modulation length of the graduation (one time this length in the particular case represented, i.e. $m_1=m_2=1$). The result of the measurement of distances $d_1$ and $d_2$ is then not biased by the modulation of the graduation.

However, the inventors make clear that the interpretation of the invention which has just been presented has no rigorous basis, and does not correspond to a resolution of the fundamental equations which describe the physical phenomena implemented.

Finally, it is understood that the invention can be applied to numerous configurations of inertia sensor-type devices, although these configurations are different from those which have been described in detail and illustrated. The cancelling-out of the measurement bias which is caused by the Raman source with modulation of an initial laser source, or at the very least a reduction in this measurement bias, is obtained identically.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method of measurement by means of atom interferometry, in which several interactions between a laser radiation and atoms are successively caused, the atoms progressing over a path which is not situated in a plane perpendicular to an axis of propagation of the laser radiation, so as to form an interferometer for the atoms, applying laser radiation used for each interaction at different positions of the atoms on their path, comprising at least one first and one second monochromatic components with respective frequencies which are distinct, so that the interaction is of two-photon Raman type, with an absorption and an emission each stimulated by the first or the second monochromatic component, the first monochromatic component being part of an initial laser radiation, and the second monochromatic component resulting from a modulation of said initial laser radiation at a determined modulation frequency, wherein a distance between any two of the positions at which interactions are caused, the distance measured along the axis of propagation of the laser radiation, is a multiple of a modulation length to within ±10% of this modulation length, and said modulation length is equal to the velocity of propagation of the laser radiation divided by twice the determined modulation frequency.

2. The method according to claim 1, wherein the atoms are subjected only to a gravity field g and, irrespective of the pair of successive interactions between the laser radiation and the atoms, the following relationships are satisfied to within 5% with respect to the value of each equality:

$$T=[a \cdot C/(2 \cdot v_{mod} \cdot g \cdot u)]^{1/2}$$

$$v_0 \cdot u = (b-a/2)/[C \cdot g \cdot u/(2 \cdot a \cdot v_{mod})]^{1/2}$$

where T is the period of time separating the two successive interactions, u is a unit vector parallel to the axis of propagation of the laser radiation, a and b are integers, a being non-zero, and $v_0$ is a velocity vector of the atoms at the time of the first interaction.

3. The method according to claim 2, wherein the successive interactions between the atoms and the laser radiation constitute a Mach-Zehnder type sequence, comprising three pulses of laser radiation which are produced at regular time intervals, respectively a first $\pi/2$ pulse, then a second $\pi$ pulse, and a last $\pi/2$ pulse, and wherein the number b is equal to $(-a+1)/2$ or $(a+1)/2$ if the number a is odd, and the number b is equal to $(-a+2)/2$ or $(a+2)/2$ if the number a is even.

4. The method according to claim 3, wherein the number a is equal to 3 and the number b is equal to −1 or 2, or the number a is equal to 1 and the number b is equal to 0 or 1.

5. The method according to claim 1, wherein the distance between two of the positions of the atoms at which interactions are caused with the laser radiation is adjusted according to one of the following methods:

/i/ by adjusting the time intervals separating the interactions between the atoms and the laser radiation and by adjusting the initial velocity of the atoms when said atoms are launched at the start of the path; or /ii/ by adjusting the time intervals separating the interactions between the atoms and the laser radiation and by adjusting a waiting time between the placing of the atoms at the start of the path, with an initial zero velocity of said atoms, and the first interaction of the atoms with the laser radiation; or /iii/ by combining methods /i/ and /iii/.

6. The method according to claim 1, wherein the path of the atoms is rectilinear and parallel to the axis of propagation of the laser radiation, and superimposed on said laser radiation.

7. The method according to claim 1, for measuring an acceleration, a speed of rotation, a gravity field, or a gravity field gradient.

8. A device for measurement by atom interferometry comprising:
- a source of atoms suitable for producing an initial set of atoms intended to progress over a path;
- an interferometry system, which is suitable for forming an interferometer for the atoms, and itself comprising:
  - a device for producing a laser radiation, arranged in order to successively cause several interactions between atoms and the laser radiation, and comprising in order to produce each interaction:
    - a laser source suitable for producing an initial monochromatic laser radiation; and
    - a modulator arranged for modulating the initial monochromatic laser radiation, so that each laser radiation used for one of the interactions comprises at least one first and one second monochromatic components having respective frequencies which are distinct, and suitable so that each interaction is of two-photon Raman type, with an absorption and an emission each stimulated by the first or the second monochromatic component, the first monochromatic component being part of the initial monochromatic laser radiation, and the second monochromatic component resulting from a modulation of said initial monochromatic laser radiation produced by said modulator at a determined modulation frequency; and
  - a control unit suitable for directing the laser radiation at the atoms when said atoms are situated at determined positions on the path, said path not being situated in a plane perpendicular to an axis of propagation of the laser radiation; and
- a detection device arranged in order to provide a measurement result based on the interference, wherein the control unit is moreover adjusted in order to direct the laser radiation at the atoms when the distance between any two of the positions at which the interactions are caused, measured along the axis of propagation of the laser radiation, is a multiple of a modulation length to within $\pm 10\%$ of said modulation length, and said modulation length being equal to the velocity of propagation of the laser radiation divided by twice the determined modulation frequency.

9. The device according to claim 8, suitable for implementing a method according to claim 2.

10. The device according to claim 8, comprising moreover means for modifying an initial velocity of the atoms during a launching of said atoms at the start of the path, said means being arranged so that the distance between two of the positions of the atoms at which the interactions are caused is adjusted by modifying the initial velocity of the atoms thereof.

11. The device according to claim 8, comprising moreover an optical shutter arranged for controlling the synchronisation of the interactions between the atoms and the laser radiation, and control means of the shutter suitable for adjusting the distance between two of the positions of the atoms at which the interactions are caused.

12. The device according to claim 8, arranged so that the path of the atoms is rectilinear and parallel to the axis of propagation of the laser radiation, and superimposed on said laser radiation.

13. The device according to claim 8, is an inertial sensor type.

14. The device according to claim 13, of a type selected from an accelerometer, a gyrometer, a gravimeter or a gradiometer.

* * * * *